(12) United States Patent
Chang et al.

(10) Patent No.: US 9,019,379 B2
(45) Date of Patent: Apr. 28, 2015

(54) LICENSE PLATE IMAGE-PICKUP DEVICE AND IMAGE EXPOSURE ADJUSTMENT METHOD THEREOF

(75) Inventors: Wen-Yan Chang, Miaoli County (TW); Tai-Chang Yang, Kaohsiung (TW); Chia-Chun Hsieh, Hsinchu (TW); Shan-Lung Chao, Hsinchu (TW); Hsin-Te Wang, Nantou County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 420 days.

(21) Appl. No.: 13/474,380

(22) Filed: May 17, 2012

(65) Prior Publication Data

US 2013/0250106 A1    Sep. 26, 2013

(30) Foreign Application Priority Data

Mar. 21, 2012 (TW) ............................. 101109761 A

(51) Int. Cl.
*H04N 7/18* (2006.01)
*G08G 1/017* (2006.01)
*G06K 9/32* (2006.01)

(52) U.S. Cl.
CPC ............ *G08G 1/0175* (2013.01); *G06K 9/3258* (2013.01); *G06K 2209/15* (2013.01)

(58) Field of Classification Search
CPC ............ G06K 9/3258; G06K 2209/15; G06K 9/00771; G06K 9/00; G08G 1/0175; H04N 7/18; H04N 7/181; G08B 13/196; B60R 1/00; B60R 2300/105; B60R 11/04; B60R 2300/802

USPC .......................................................... 348/148
See application file for complete search history.

(56) References Cited

U.S. PATENT DOCUMENTS

| | | | | |
|---|---|---|---|---|
| 6,970,102 B2 * | 11/2005 | Ciolli | ............................ | 340/933 |
| 8,692,690 B2 * | 4/2014 | Dalal | ............................ | 340/936 |
| 2002/0141618 A1 * | 10/2002 | Ciolli et al. | ................... | 382/104 |
| 2002/0186297 A1 * | 12/2002 | Bakewell | ...................... | 348/118 |
| 2004/0252193 A1 * | 12/2004 | Higgins | ....................... | 348/149 |
| 2010/0128127 A1 * | 5/2010 | Ciolli | ............................ | 348/143 |
| 2010/0194902 A1 * | 8/2010 | Lin et al. | .................... | 348/222.1 |
| 2011/0205417 A1 * | 8/2011 | Hynecek | ...................... | 348/308 |
| 2011/0234749 A1 * | 9/2011 | Alon | ............................... | 348/36 |
| 2012/0033123 A1 * | 2/2012 | Inoue et al. | ............. | 348/333.13 |
| 2012/0229304 A1 * | 9/2012 | Dalal | ............................ | 340/936 |

* cited by examiner

*Primary Examiner* — Shan Elahi
(74) *Attorney, Agent, or Firm* — Muncy, Geissler, Olds & Lowe, P.C.

(57) ABSTRACT

The present invention discloses a license plate image-pickup device and an image exposure adjustment method thereof. The license plate image-pickup device comprises an image-sensing module, a recognition module and a processing module. The license plate image-pickup device takes a scene. The image-sensing module senses the scene to produce an image. The recognition module detects a vehicle object. The processing module adjusts the exposure of the vehicle object to produce an exposure adjusted vehicle object, and then the recognition module detects a license plate object from the exposure adjusted vehicle object, and the processing module adjusts the exposure of the license plate object.

6 Claims, 6 Drawing Sheets

LICENSE PLATE IMAGE-PICKUP DEVICE AND IMAGE EXPOSURE ADJUSTMENT METHOD THEREOF

CROSS-REFERENCE TO RELATED APPLICATION

This application claims the benefit of Taiwan Patent Application No. 101109761, filed on Mar. 21, 2012, in the Taiwan Intellectual Property Office, the disclosure of which is incorporated herein in its entirety by reference.

BACKGROUND OF THE INVENTION

1. Field of the Invention

The present invention relates to a license plate image-pickup device and an image exposure adjustment method, and more particularly to the license plate image-pickup device and the image exposure adjustment method that adjust the exposure of the license plate image.

2. Description of Related Art

As scientific investigation becomes popular, intersection surveillance monitors are used to clarify the attribution of responsibility in many car accidents occurred in big cities. However, the density of installing the monitors is limited, and images of the accident scene cannot be recorded clearly in some situations. In addition, once a car enters into suburbs or scenic areas, the installation of monitors is rare. Once a car accident occurs, a policeman or investigator is required to go to the scene to clarify the attribution of responsibility. Therefore, the installation of a driving recorder in a car becomes increasingly popular, so that our legal rights can be protected in critical moments. In general, the driving recorder has the image recording and storage functions, and some driving recorders even come with a sound recording function.

When a car accident occurs, the image of the driving recorder can reproduce the actual situation of the car accident to assist the police or related unit to know the actual situation, and the license plate data contained in the image can be used as a line to hunt for the car accident perpetrator. To clearly show the license plate data, some driving recorders use an automatic exposure adjustment to achieve the purpose. However, some of the conventional automatic exposure adjustment modules of the driving recorders use the brightness of the whole image as a reference base or use a high dynamic range imaging (HDRI) method to adjust the exposure of the image. The effect is very limited, since the environment is changed so quickly.

In view of the aforementioned problems, it is an urgent issue for related designers and manufacturers to design and produce a license plate image-pickup device and an image exposure adjustment method thereof to show the license plate image clearly. With the pixel-based complementary metal oxide semiconductor sensor (pixel-based CMOS sensor) technology, the inventor of the present invention designs a license plate image-pickup device and an image exposure adjustment method thereof in accordance with the present invention to overcome the drawbacks of the prior art.

SUMMARY OF THE INVENTION

In view of the aforementioned problems of the prior art, it is a primary objective of the invention to provide a license plate image-pickup device and an image exposure adjustment method thereof to achieve the effect of adjusting the exposure of the license plate.

Another objective of the present invention is to provide a license plate image-pickup device for taking a scene, and the license plate image-pickup device comprises: an image sensing module, a recognition module and a processing module. The image sensing module senses the scene to produce an image. The recognition module recognizes a vehicle object contained in the image. The processing module adjusts an exposure of the vehicle object to produce an exposure adjusted vehicle object, and the recognition module further recognizes a license plate object contained in the exposure adjusted vehicle object, and the processing module further adjusts the exposure of the license plate object.

Wherein, the image sensing module is a pixel-based complementary metal oxide semiconductor sensor (pixel-based CMOS sensor).

Wherein, the license plate image-pickup device further comprises a metering module for metering the scene to produce image exposure data, metering the license plate object to produce a license plate exposure data, and metering an area other than the license plate object contained in the scene to produce area exposure data.

Wherein, the processing module adjusts the exposure of the image according to the image exposure data, the license plate exposure data and the area exposure data.

Wherein, the license plate exposure data has a different weight value according to a different size of the license plate object or a different position of the license plate object contained in the scene.

Another objective of the present invention is to provide an image exposure adjustment method comprising the steps of: using an image sensing module to sense a scene to produce an image; using a recognition module to recognize a vehicle object contained in the image; using a processing module to adjust an exposure of the vehicle object to produce an exposure adjusted vehicle object; using the recognition module to recognize a license plate object contained in the exposure adjusted vehicle object; and using the processing module to adjust the exposure of the license plate object.

Wherein, the image sensing module includes a pixel-based complementary metal oxide semiconductor sensor (pixel-based CMOS sensor).

Wherein, the image exposure adjustment method further comprises the steps of: providing a metering module to meter the scene to produce a image exposure data; using the metering module to meter the license plate object to produce a license plate exposure data; using the metering module to meter an area other than the license plate object contained in the scene to produce an area exposure data; and using the processing module to adjust the exposure of the image according to the image exposure data, the license plate exposure data and the area exposure data.

Wherein, the license plate exposure data has a different weight value according to a different size of the license plate object or a different position of the license plate object contained in the scene.

Another objective of the present invention is to provide a license plate image-pickup device, for taking a scene, and comprising: a photo sensor, for sensing the scene to produce a sensing signal; an image processing module, for producing an image according to the sensing signal; a recognition module, for recognizing a vehicle object contained in the image; and a processing module, for adjusting an exposure of vehicle object to produce an exposure adjusted vehicle object, wherein the recognition module further recognizes a license plate object contained in the exposure adjusted vehicle object, and the processing module further adjusts the exposure of the license plate object.

Wherein, the image sensor is a pixel-based complementary metal oxide semiconductor sensor (pixel-based CMOS sensor).

Wherein, the license plate image-pickup device further comprises a metering module for metering the scene to produce an image exposure data, metering the license plate object to produce an license plate exposure data, and metering an area other than the license plate object contained in the scene to produce an area exposure data.

Wherein, the processing module adjusts the exposure of the image according to the image exposure data, the license plate exposure data and the area exposure data.

Wherein, the license plate exposure data has a different weight value according to a different size of the license plate object or a different position of the license plate object contained in the scene.

In summation, the license plate image-pickup device and the image exposure adjustment method of the present invention have one or more of the following advantages:

(1) The license plate image-pickup device and the image exposure adjustment method of the present invention adjust the exposure of the license plate contained in the image according to the exposure data of the object contained in the image for several times, so that the license plate data can be recognized more easily.

(2) The license plate image-pickup device and the image exposure adjustment method of the present invention meter the whole image, the vehicle object, the license plate object and the area other than the vehicle object contained in the scene and use the weight value to adjust the area other than the vehicle object contained in the image to show the actual road condition of the image.

DETAILED DESCRIPTION OF THE PREFERRED EMBODIMENTS

The technical contents and characteristics of the present invention will be apparent with the detailed description of a preferred embodiment accompanied with related drawings as follows. The drawings are provided for the purpose of illustrating the invention but not necessarily drawn according to the actual scale or precision or limited thereto. For simplicity, same numerals are used in the following preferred embodiment to represent respective same elements.

Figure 1:
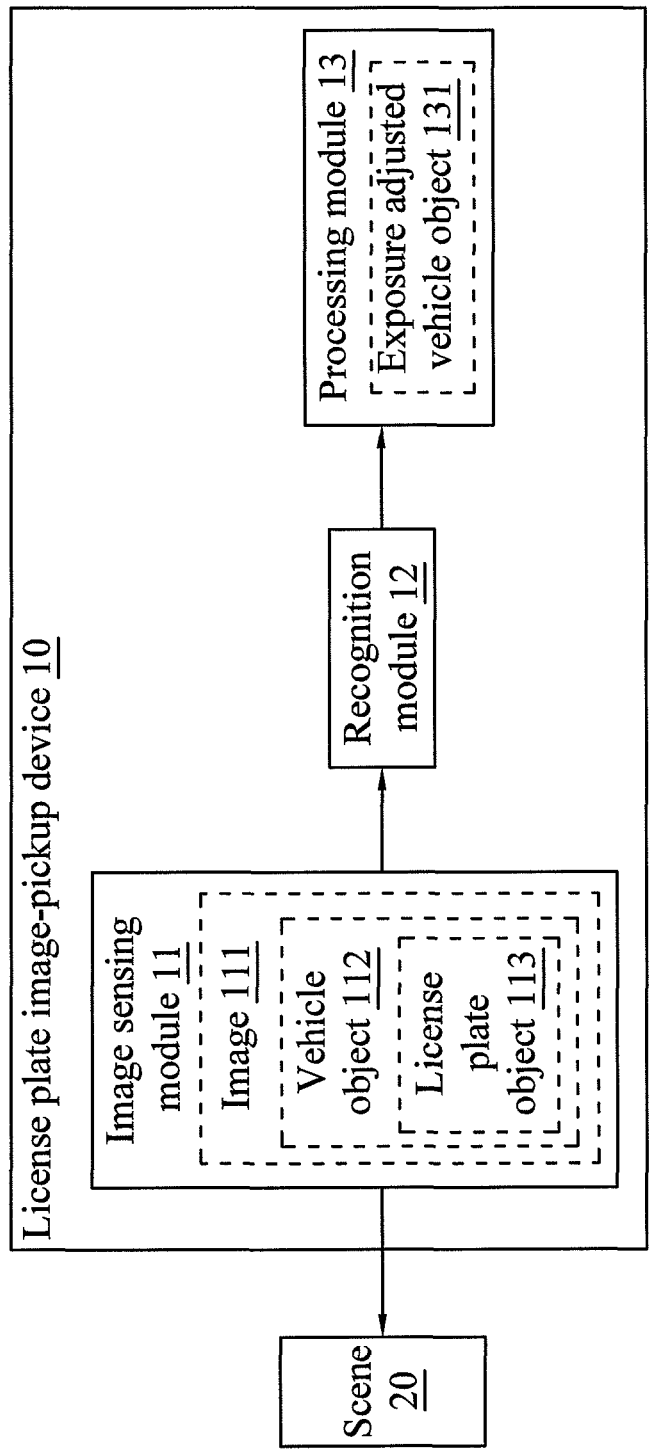
FIG. 1 is a block diagram of a license plate image-pickup device of the present invention.

With reference to FIG. 1 for a block diagram of a license plate image-pickup device of the present invention, the license plate image-pickup device 10 takes a scene 20 and comprises: an image sensing module 11, a recognition module 12 and a processing module 13. The image sensing module 11 senses a scene 20 to produce an image 111. The recognition module 12 recognizes a vehicle object 112 contained in the image 111. The processing module 13 adjusts an exposure of the vehicle object 112 to produce an exposure adjusted vehicle object 131. The recognition module 12 recognizes a license plate object 113 contained in the exposure adjusted vehicle object 131, and the processing module 13 further adjusts the exposure of the license plate object 113. Wherein, the recognition module 12 can be a digital signal processor (DSP) and the processing module 13 can be a central processing unit (CPU) or a microprocessor. In other words, the license plate image-pickup device 10 of the present invention can adjust the exposure of the license plate object 113, so that the image 111 can show the actual condition of the license plate object 113 clearly to overcome the drawback of the conventional license plate image-pickup device that adjusts the exposure of the whole image 111 and fails to recognize the license plate data effectively.

Figure 2:
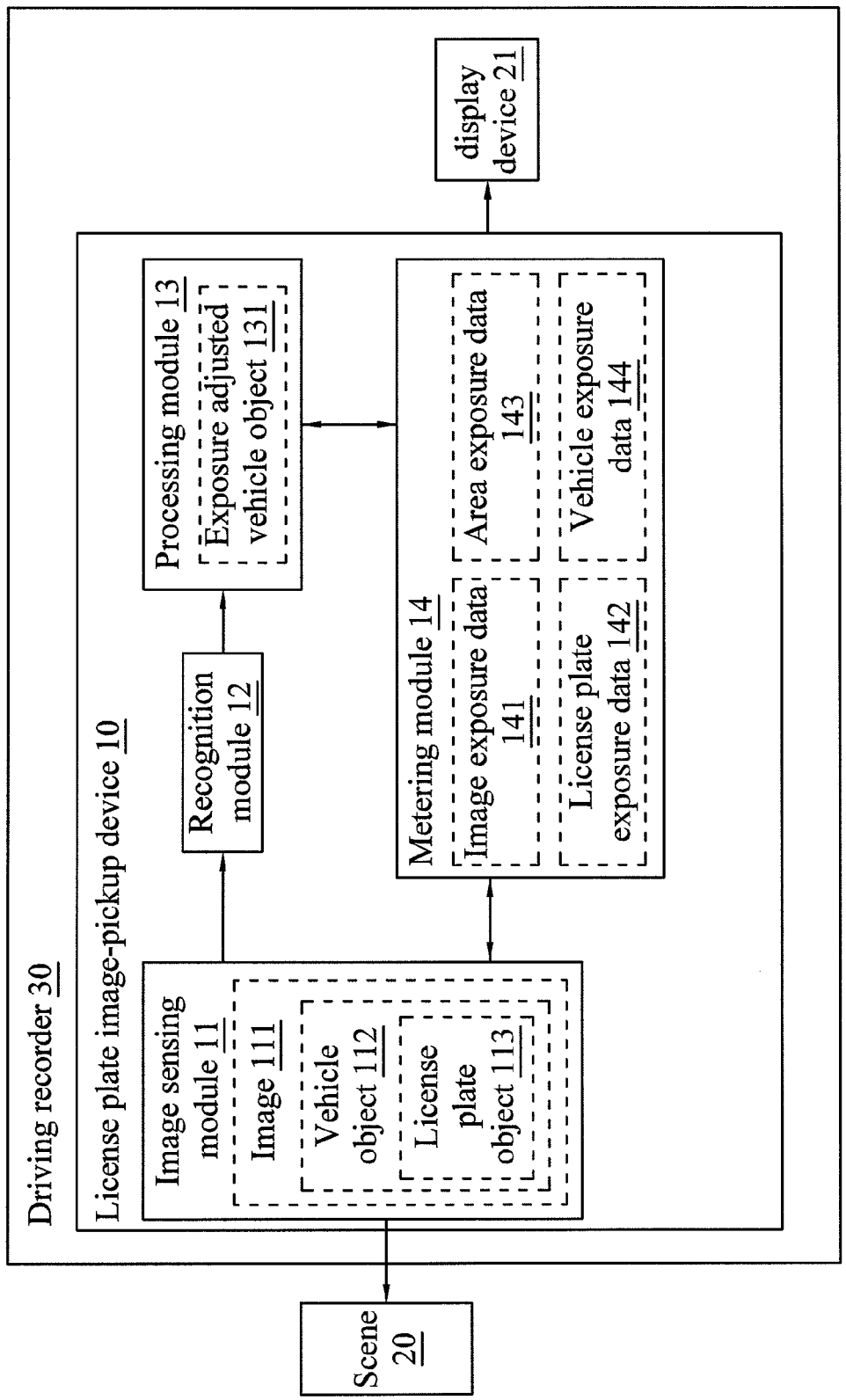
FIG. 2 is a block diagram of a license plate image-pickup device in accordance with a first preferred embodiment of the present invention.
Figure 3:
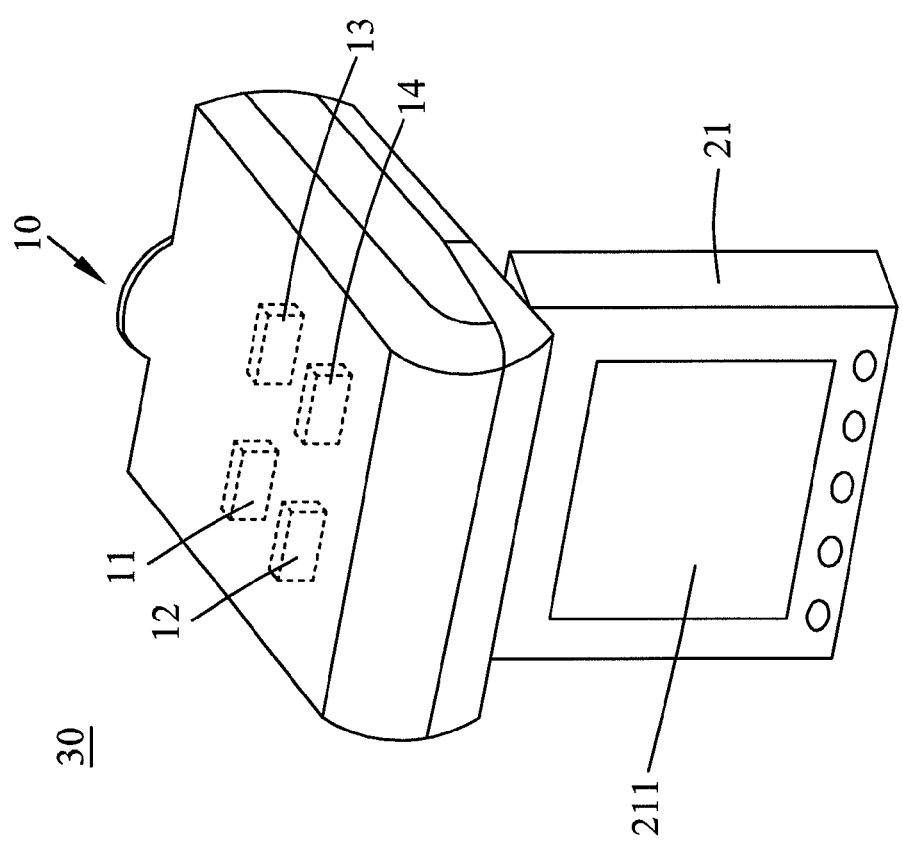
FIG. 3 is a first schematic view of a license plate image-pickup device in accordance with the first preferred embodiment of the present invention.
Figure 4:
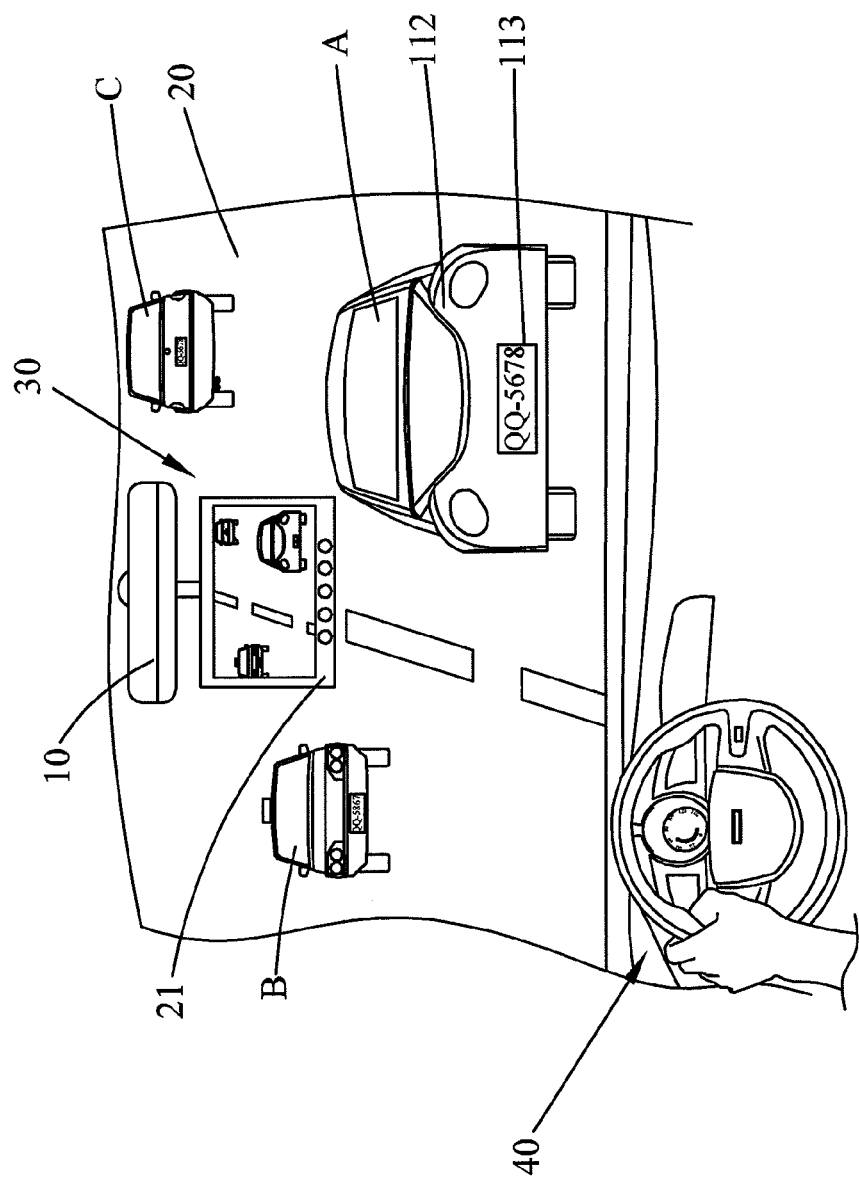
FIG. 4 is a second schematic view of a license plate image-pickup device in accordance with the first preferred embodiment of the present invention.

With reference to FIGS. 2 to 4 for a block diagram, a first schematic view and a second schematic view of a license plate image-pickup device in accordance with the first preferred embodiment of the present invention respectively, the license plate image-pickup device 10 can be applied in a mobile vehicle 40 and used in a driving recorder 30. In FIGS. 2 and 3, the driving recorder 30 comprises a license plate image-pickup device 10 and a display device 21. The license plate image-pickup device 10 is electrically coupled to the display device 21. Wherein, the display device 21 can be integrally formed with the license plate image-pickup device 10 according to the actual requirements. The driving recorder 30 senses a scene 20 through the license plate image-pickup device 10 to produce an image 111. After the exposure of the image 111 is adjusted, the image 111 is displayed on a display screen 211 of the display device 21. The license plate image-pickup device 10 comprises an image sensing module 11, a recognition module 12, a processing module 13 and a metering module 14. The image sensing module 11 senses a scene 20 to produce an image 111. Wherein, the image sensing module 11 includes a camera lens, a photo sensor such as a pixel-based complementary metal oxide semiconductor sensor (pixel-based CMOS sensor), an analog/digital circuit, and an image processing unit. The recognition module 12 recognizes the vehicle object 112 and its license plate object 113 contained in the image 111. The metering module 14 meters the image 111, the license plate object 113, the vehicle object 112 and an area other than the vehicle object 112 contained in the image 111 to produce an image exposure data 141, an license plate exposure data 142, area exposure data 143 and a vehicle exposure data 144 respectively. The processing module 13 adjusts the exposure of the license plate object 113 according to the license plate exposure data 142, and adjusts the exposure of the area other than the vehicle object 112 contained in the image 111 according to the image exposure data 141, the area exposure data 143 and the vehicle exposure data 144. Wherein, the license plate exposure data 142 has a different weight value according to a different position contained in the image 111.

In FIG. 4, assumed that there are Car A, Car B and Car C (vehicle object 112) on a road (scene 20) and situated sequentially from a near location to a far location, and the image sensing module 11 senses the scene 20 to produce an image 111. The metering module 14 meters the image 111 to produce an image exposure data 141. The recognition module 12 recognizes the cars A, B and C contained in the image 111, and recognizes a license plate A, a license plate B and a license plate C (license plate object 113) contained in image 11. The metering module 14 meters the cars A, B and C and their license plates to produce an license plate exposure data 142 and the vehicle exposure object data 144, and meters an area other than the cars A, B and C contained in the scene 20 to produce area exposure data 143. The processing module 13 adjusts the exposure of the license plate object 113 according to the license plate exposure data 142. Wherein, the license plate exposure data 142 has a different weight value according to a different position or a different size of the license plate object 113. In other words, the license plate A has a greater weight value than the license plate C. The processing module 13 adjusts the exposure of an area other than the vehicle object 112 contained in the image 111 according to the image exposure data 141, the area exposure data 143 and the vehicle exposure data 144. Wherein, the image exposure data 141 has a smaller weight value than the area exposure data 143, and the weight value can be adjusted according to actual requirements. In addition, the exposure of the license plate object 113 can be adjusted for the second time in order to recognize the license plate displayed contained in the image 111 more easily. More specifically, the recognition module 12 recognizes the vehicle object 112 contained in the image 111, and the processing module 13 adjusts the exposure of the vehicle object 112 (which is referred to as the first-time exposure adjustment of the license plate object 113) to produce an exposure adjusted vehicle object 131; and the recognition module 12 recognizes the license plate object 113 contained in the exposure adjusted vehicle object 131, and the processing module 13 adjusts the exposure of the license plate object 113 again (which is referred to as the second-time exposure adjustment).

In short, the license plate image-pickup device 10 uses the metering module 14 to capture the exposure data (such as an aperture size, an exposure time or an exposure value) of the object (including the license plate object 113 and the vehicle object 112) contained in the image 111 and adjust the exposure value of the license plate object 113, and uses the image exposure data 141, the area exposure data 143 and the vehicle exposure data 144 to adjust the exposure value of the area other than the vehicle object 112 contained in the image 111. When the exposure of the area other than the vehicle object 112 is adjusted, the license plate exposure data 142 can be added, and the allocation of the weight values is used together to provide a more accurate road condition of the image 111.

Figure 5:
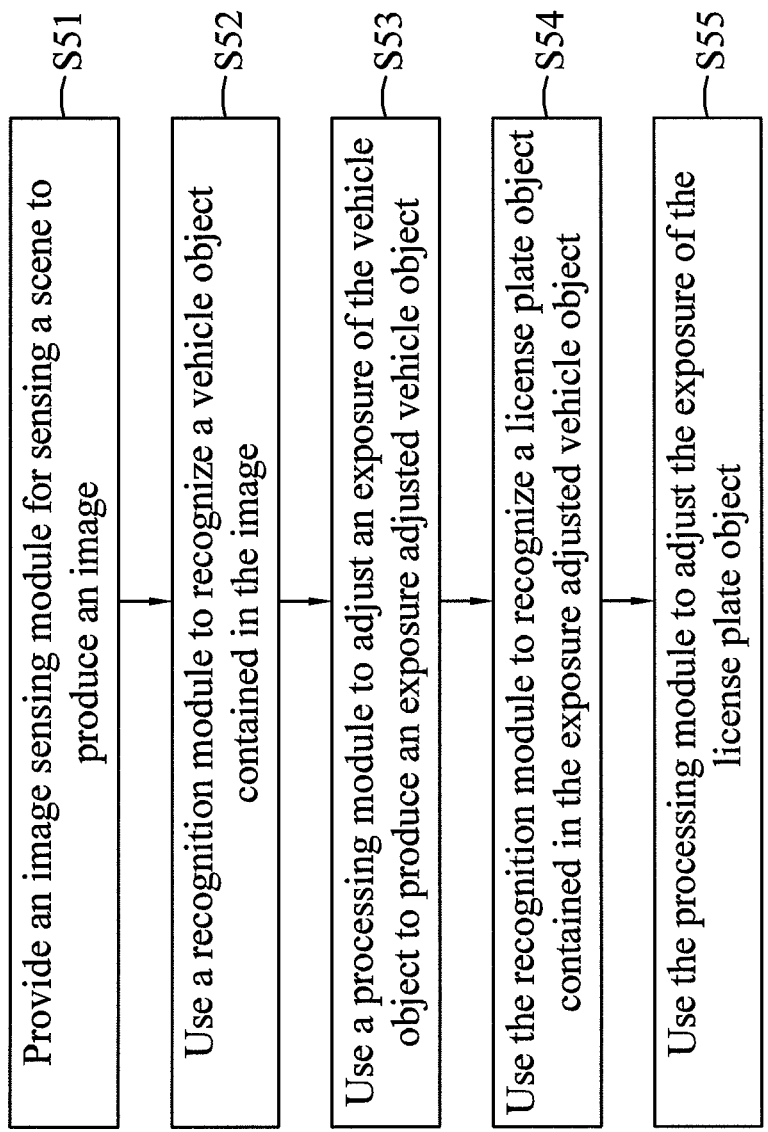
FIG. 5 is a flow chart of an image exposure adjustment method of the present invention.

With reference to FIG. 5 for a flow chart of an image exposure adjustment method of the present invention, the image exposure adjustment method can be applied in a license plate image-pickup device 10, and the method comprises the following steps:

S51: Provide an image sensing module for sensing a scene to produce an image.

S52: Use a recognition module to recognize a vehicle object contained in the image.

S53: Use a processing module to adjust an exposure of the vehicle object to produce an exposure adjusted vehicle object.

S54: Use the recognition module to recognize a license plate object contained in the exposure adjusted vehicle object.

S55: Use the processing module to adjust the exposure of the license plate object.

The details and implementation method of the image white balance adjustment method of the present invention have been described in the section of the license plate image-pickup device of the present invention, and thus will not be described again.

Figure 6:
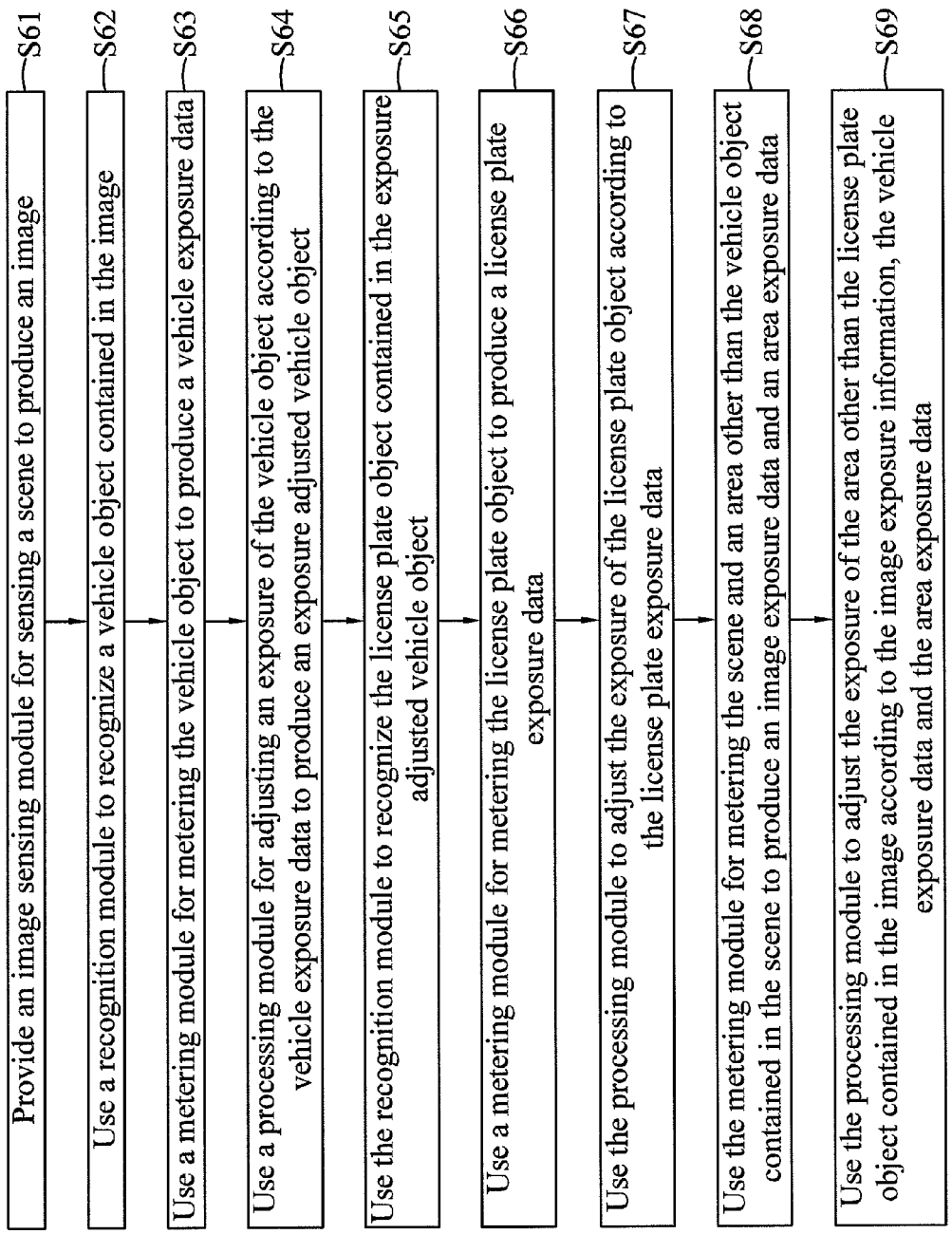
FIG. 6 is a schematic view of an image exposure adjustment method in accordance with a preferred embodiment of the present invention.

With reference to FIG. 6 for a flow chart of an image exposure adjustment method in accordance with a preferred embodiment of the present invention, the image exposure adjustment method can be applied in a license plate image-pickup device 10 and comprises the following steps:

S61: Provide an image sensing module for sensing a scene to produce an image.

S62: Use a recognition module to recognize a vehicle object contained in the image.

S63: Use a metering module for metering the vehicle object to produce a vehicle exposure data.

S64: Use a processing module for adjusting an exposure of the vehicle object according to the vehicle exposure data to produce an exposure adjusted vehicle object.

S65: Use the recognition module to recognize the license plate object contained in the exposure adjusted vehicle object.

S66: Use a metering module for metering the license plate object to produce a license plate exposure data.

S67: Use the processing module to adjust the exposure of the license plate object according to the license plate exposure data.

S68: Use the metering module for metering the scene and an area other than the vehicle object contained in the scene to produce an image exposure data and an area exposure data.

S69: Use the processing module to adjust the exposure of the area other than the license plate object contained in the image according to the image exposure information, the vehicle exposure data and the area exposure data.

What is claimed is:

1. A license plate image-pickup device, taking a scene, and comprising:
    an image sensing module, arranged for sensing the scene to produce an image;
    a recognition module, arranged for recognizing a vehicle object contained in the image;
    a processing module, arranged for adjusting an exposure of the vehicle object to produce an exposure adjusted vehicle object, and the recognition module further recognizing a license plate object contained in the exposure adjusted vehicle object, and the processing module further adjusting the exposure of the license plate object; and
    a metering module for metering the scene to produce an image exposure data, metering the license plate object to produce a license plate exposure data, and metering an area other than the license plate object contained in the scene to produce an area exposure data,
    wherein the processing module adjusts the exposure of the image according to the image exposure data, the license plate exposure data and the area exposure data, and the license plate exposure data has a different weight value according to a different size of the license plate object or a different position of the license plate object contained in the scene.

2. The license plate image-pickup device of claim 1, wherein the image sensing module is a pixel-based complementary metal oxide semiconductor sensor (pixel-based CMOS sensor).

3. An image exposure adjustment method, comprising the steps of:
    using an image sensing module to sense a scene to produce an image;
    using a recognition module to recognizing a vehicle object contained in the image;
    using a processing module to adjust an exposure of the vehicle object to produce an exposure adjusted vehicle object;
    using the recognition module to recognizing a license plate object contained in the exposure adjusted vehicle object;

using the processing module to adjust the exposure of the license plate object;

providing a metering module to meter the scene to produce an image exposure data;

using the metering module to meter the license plate object to produce a license plate exposure data;

using the metering module to meter an area other than the license plate object contained in the scene to produce an area exposure data; and using the processing module to adjust the exposure of the image according to the image exposure data, the license plate exposure data and the area exposure data, wherein the license plate exposure data has a different weight value according to a different size of the license plate object or a different position of the license plate object contained in the scene.

4. The image exposure adjustment method of claim 3, wherein the image sensing module is a pixel-based complementary metal oxide semiconductor sensor (pixel-based CMOS sensor).

5. A license plate image-pickup device, taking a scene, and comprising:

a photo sensor, arranged for sensing the scene to produce a sensing signal;

an image processing module, arranged for producing an image according to the sensing signal;

a recognition module, arranged for recognizing a vehicle object contained in the image;

a processing module, arranged for adjusting an exposure of the vehicle object to produce an exposure adjusted vehicle object, and the recognition module further recognizing a license plate object contained in the exposure adjusted vehicle object, and the processing module further adjusting the exposure of the license plate object; and a metering module for metering the scene to produce an image exposure data, metering the license plate object to produce a license plate exposure data, and metering an area other than the license plate object contained in the scene to produce an area exposure data, wherein the processing module adjusts the exposure of the image according to the image exposure data, the license plate exposure data and the area exposure data, and the license plate exposure data has a different weight value according to a different size of the license plate object or a different position of the license plate object contained in the scene.

6. The license plate image-pickup device of claim 5, wherein the photo sensor is a pixel-based complementary metal oxide semiconductor sensor (pixel-based CMOS sensor).

* * * * *